No. 730,778. Patented June 9, 1903.

UNITED STATES PATENT OFFICE.

GEORGE KUNICK, OF LONDON, ENGLAND.

MANUFACTURE OF TILES, SLABS, OR THE LIKE.

SPECIFICATION forming part of Letters Patent No. 730,778, dated June 9, 1903.

Application filed November 13, 1902. Serial No. 131,229. (No specimens.)

*To all whom it may concern:*

Be it known that I, GEORGE KUNICK, a subject of the Emperor of Germany, residing at 5 Great Winchester street, London, E. C., England, have invented certain new and useful Improvements Relating to the Manufacture of Tiles, Slabs, or the Like, of which the following is a specification.

This invention relates to the manufacture of tiles, slabs, and bricks from sand and lime or other materials similar to sand and subsequently hardened by means of carbonic-acid gas.

This invention has for its object to enable a better tile or block than has hitherto been produced from such materials to be obtained by means of an additional furnacing operation.

It has been proposed to burn a silicate-of-lime and sand brick in a furnace; but such furnacing operation has not hitherto been applied to articles composed almost entirely of carbonate of lime and sand, as is the case in this invention. A further part of this process consists in effecting the hardening of the bricks, tiles, and the like by immersing the articles entirely in an atmosphere of carbonic-acid gas, no pressure being required nor special joining of the articles together, the articles being so shaped or supported as to allow of free access of the carbonic-acid gas around their whole surfaces.

The present invention therefore consists in a process comprising the following operations: First, mixing of lime and good quartz sand in proper proportion with one another and then forming into shape in molds or under pressure in a suitable press; second, hardening the articles thus produced by treatment with carbonic-acid gas, whereby the lime contained therein is changed into carbonate of lime, either (*a*) by carbonic-acid gas supplied under certain pressure to jets which pass within the blocks or are tightly fixed to their surfaces and allow of the flow of gas outwardly through their body, (*b*) by carbonic-acid gas supplied either with or without pressure to a chamber containing the articles, these articles being so supported in relation to one another as to allow of free access to the carbonic-acid gas over all their surfaces, so that the hardening operation may be effective; third, furnacing the articles so produced at a temperature which will cause them to become consolidated and eventually made fireproof.

In carrying this invention into effect according to one modification as applied in the manufacture of tiles, for example, these are formed from sand and lime in the usual manner by stamping in molds or by means of a hydraulic or other pressing machine. The tiles thus produced, which are preferably made with ribbed bottom surfaces, are piled in a gas-tight chamber on the top of one another. Carbonic-acid gas is then admitted to fill the chamber, and as the tiles are comparatively thin and are supported by their ribbed under surfaces, so that the carbonic-acid gas can reach practically their whole surface, the indurating process takes place thoroughly in a comparatively short time. As soon as the indurating process is completed the tiles are removed and placed in a suitable furnace, where they are raised to a very high temperature. The temperature must be high enough to consolidate the tiles further by destroying the small quantity of lime contained therein and fusing the particles of sand or quartz together. A tile of a very high quality is thus produced, indurating by carbonic-acid gas being an essential feature of this process. The induration may be effected, however, without ribbing the surfaces of the tiles by interposing separators between the tiles, these separators permitting free access of the carbonic-acid gas to the tile surfaces.

Where induration has to be effected in articles of considerable body, such as bricks, these are molded with perforations right through them, so that the body of the material to be penetrated by the carbonic-acid gas may not in any case be excessive.

Carbonic-acid gas may be supplied to the chambers under pressure, if desired, and provision may be made for the carbonic acid to reach the internal portions of the bricks or other articles first, reaching the external atmosphere by percolation through the walls of the articles.

Any suitable sand, slag, slate, or the like may be used instead of quartz sand.

Having now described my invention, what I claim as new, and desire to secure by Letters Patent, is—

1. A process for the manufacture of tiles, slabs, bricks and similar articles, consisting in pressing to shape a mixture of sand and lime, indurating the articles by treating them with carbonic-acid gas and finally submitting them to a high temperature in a furnace.

2. A process for the manufacture of tiles, slabs, bricks and similar articles, consisting in pressing to shape a mixture of sand and lime, indurating the articles by treating them with carbonic-acid gas under pressure and finally submitting them to a high temperature in a furnace.

3. A process for the manufacture of tiles, slabs, bricks and similar articles, consisting in molding a mixture of sand and lime to a form having perforations, indurating the articles by treating them with carbonic-acid gas led to the interior of the articles through said perforations and finally submitting them to a high temperature in a furnace.

In witness whereof I have hereunto set my hand in presence of two witnesses.

GEORGE KUNICK.

Witnesses:
ALBERT EDWARD PARKER,
FRANCIS J. BIGNELL.